US 9,152,566 B2

(12) United States Patent
Alexander et al.

(10) Patent No.: US 9,152,566 B2
(45) Date of Patent: Oct. 6, 2015

(54) PREFETCH ADDRESS TRANSLATION USING PREFETCH BUFFER BASED ON AVAILABILITY OF ADDRESS TRANSLATION LOGIC

(75) Inventors: Khary J. Alexander, Poughkeepsie, NY (US); Ilia Averbouch, Haifa (IL); Ariel J. Birnbaum, Kiryat Motzkin (IL); Jonathan T. Hsieh, Poughkeepsie, NY (US); Christian Jacobi, Schoenaich (DE); Shmuel Paycher, Kfar Saba (IL); Chung-Lung K. Shum, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 297 days.

(21) Appl. No.: 13/523,919

(22) Filed: Jun. 15, 2012

(65) Prior Publication Data
US 2013/0339650 A1    Dec. 19, 2013

(51) Int. Cl.
*G06F 12/08* (2006.01)
*G06F 12/10* (2006.01)

(52) U.S. Cl.
CPC ........ *G06F 12/0862* (2013.01); *G06F 12/1009* (2013.01)

(58) Field of Classification Search
CPC .................. G06F 12/1027; G06F 12/1036
USPC ............... 711/6, 100, E12.001, E12.014, 711/E12.058, E12.061, E12.095, 200–221
See application file for complete search history.

(56) References Cited

U.S. PATENT DOCUMENTS

| | | | | |
|---|---|---|---|---|
| 4,747,044 A * | 5/1988 | Schmidt et al. | | 711/206 |
| 6,728,800 B1 * | 4/2004 | Lee et al. | | 711/133 |
| 7,234,040 B2 * | 6/2007 | Berg et al. | | 711/213 |
| 7,533,220 B2 * | 5/2009 | Diefendorff | | 711/137 |
| 8,015,359 B1 * | 9/2011 | Favor et al. | | 711/133 |
| 8,301,865 B2 * | 10/2012 | Grohoski et al. | | 711/207 |
| 2006/0136696 A1 * | 6/2006 | Grayson | | 711/206 |
| 2008/0294867 A1 * | 11/2008 | Kimura | | 711/204 |
| 2009/0019261 A1 * | 1/2009 | Nguyen et al. | | 712/207 |

OTHER PUBLICATIONS

Zhou, X., "Low-power and real-time address translation through arithmetic operations for virtual memory support in embedded systems." Mar. 2008. Computers & Digital Techniques, IET. vol. 2, Issue: 2. pp. 75-85.*

* cited by examiner

*Primary Examiner* — Michael Jung
*Assistant Examiner* — Mikka Liu
(74) *Attorney, Agent, or Firm* — Cantor Colburn LLP; Margaret McNamara

(57) ABSTRACT

Embodiments relate to prefetch address translation in a computer processor. An aspect includes issuing, by prefetch logic, a prefetch request comprising a virtual page address. Another aspect includes, based on the prefetch request missing the TLB and the address translation logic of the processor being busy performing a current translation request, comparing a page of the prefetch request to a page of the current translation request. Yet another aspect includes, based on the page of the prefetch request matching the page of the current translation request, storing the prefetch request in a prefetch buffer.

20 Claims, 7 Drawing Sheets

PREFETCH BUFFER 406

| PREFETCH REQUEST 410A | MATCH TAG 411A |
|---|---|
| PREFETCH REQUEST 410B | MATCH TAG 411B |
| PREFETCH REQUEST 410C | MATCH TAG 411C |
| PREFETCH REQUEST 410N | MATCH TAG 411N |

TRANSLATION QUEUE 409

| TRANSLATION REQUEST 412A | TRANSLATION REQUEST 412B | TRANSLATION REQUEST 412C | TRANSLATION REQUEST 412D |
|---|---|---|---|

FIG. 4B

PREFETCH ADDRESS TRANSLATION USING PREFETCH BUFFER BASED ON AVAILABILITY OF ADDRESS TRANSLATION LOGIC

BACKGROUND

The present invention relates generally to computer processors, and more specifically, to prefetch address translation using a prefetch buffer in a processor.

In a computing system, the main computer memory may be relatively slow compared to the computer processor; therefore, one or more caches may be provided in the processor to reduce or avoid accesses to the main memory. A cache is a relatively small, high-speed buffer of memory placed between the processor and the main memory that holds most recently used sections of the main memory for use by the processor. The sections of memory that are stored in the cache are referred to as a cache lines. Any request made by the processor that is satisfied by the cache may be completed relatively quickly. However, when a request by the processor is not satisfied by the cache, a cache miss occurs, which may cause delays in the processor while the request is satisfied from the main memory.

Prefetching is a technique that is used to reduce delays to the processor caused by cache misses. Prefetching attempts to predict requests (for example, requests for instructions or operands) that will be made by the processor and stage lines of memory into the cache before the processor requests them. If prefetching is successful, cache lines are transferred from the main memory into the cache before the processor requests them, avoiding cache misses and reducing overall latency in the processor. However, successful completion of prefetch requests is not necessary for the correct execution of a software program by the processor, as prefetch requests have no observable effect on the observed execution of software by the processor beyond affecting the timing of instruction completion. Therefore, a prefetch request may be discarded if the resources necessary to complete the prefetch request are not available in the processor at the time of issuance of the prefetch request.

SUMMARY

Embodiments include a method, system, and computer program product for prefetch address translation in a computer processor. An aspect includes issuing, by prefetch logic, a prefetch request comprising a virtual page address. Another aspect includes, based on the prefetch request missing the TLB and the address translation logic of the processor being busy performing a current translation request, comparing a virtual page address of the prefetch request to a virtual page address of the current translation request. Yet another aspect includes, based on the virtual page address of the prefetch request matching the virtual page address of the current translation request, storing the prefetch request in a prefetch buffer.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIGS. 4A-B depict a computing system including prefetch address translation using a prefetch buffer and a translation queue in a processor in accordance with an embodiment;

DETAILED DESCRIPTION

Figure 1:
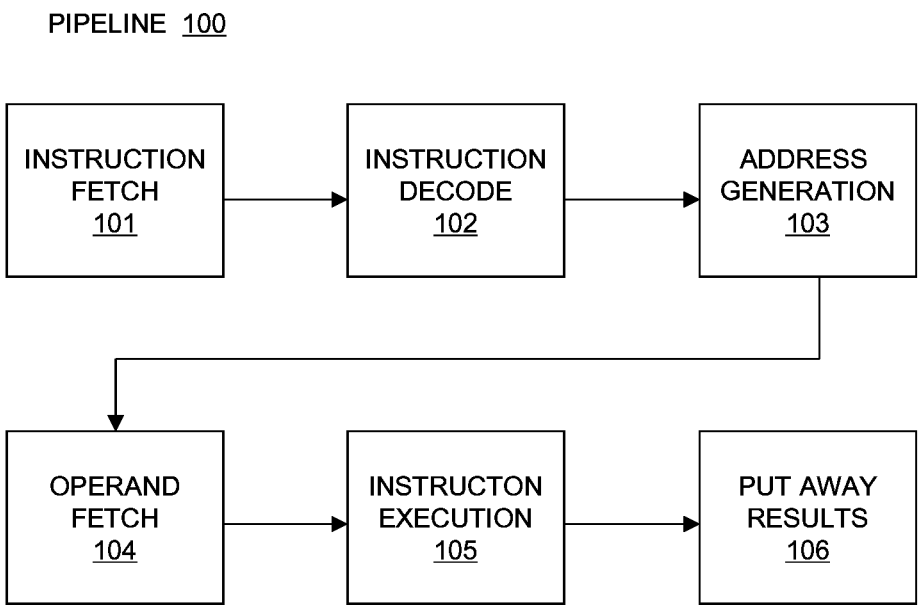
FIG. 1 depicts a pipeline in accordance with an embodiment.

Systems and methods for prefetch address translation using a prefetch buffer are provided, with exemplary embodiments being discussed below in detail. As prefetch requests proceed through the pipeline of a processor, address translation of the prefetch requests may be required in order to access the main computer memory and retrieve the line(s) that are being prefetched by the prefetch request. In order to complete address translation of a prefetch request, a translation lookaside buffer (TLB), which stores information regarding recently performed address translations, may first be checked for the address of the prefetch request. If the translation required for the prefetch request is found in TLB, the prefetch may be completed using the information from the TLB. If the prefetch request misses the TLB, a translation request may be issued to address translation logic in the processor. However, if the address translation logic is unavailable, the prefetch request may be discarded, reducing the reliability and predictability of prefetching in the processor. Therefore, a prefetch buffer is provided in the processor that may store prefetch requests until the address translation logic is available, avoiding discarding of prefetch requests due to lack of available address translation resources.

The prefetch buffer may comprise a hardware-implemented buffer that stores a plurality of prefetch requests that have missed the TLB. If a prefetch request misses the TLB and the address translation logic is not available, the page (i.e., the unit of granularity of memory that is handled by the address translation logic, which may be referenced by a virtual page address that refers to a location in the main memory) of the prefetch request is compared to the page of the translation request that is currently being handled by the address translation logic. The comparison may be performed based on the virtual page address of the prefetch request and the virtual page address of the current translation. If the pages of the prefetch request and the currently handled translation request match, the prefetch request is stored in the prefetch buffer. The address translation logic is then monitored until the current translation request has completed, at which point the prefetch request is reissued into the pipeline. Because the page of the prefetch request is known, and is the same as that of the current translation request, only the displacement within the page of the prefetch request may be stored in some embodiments, thereby reducing the storage required to implement the prefetch buffer. Further, handling of a prefetch request by the address translation logic immediately after a translation request having the same page as the prefetch request reduces the amount of time needed by the address translation logic to handle the prefetch request.

Additionally, a translation queue that holds a plurality of waiting translation requests for the address translation logic may be provided in some embodiments, and the pages of prefetch requests that miss the TLB may be compared to the pages, or virtual page addresses, of the waiting translation requests in the translation queue. If there is a match between a prefetch request page and a waiting translation request page, the prefetch request may be associated in the prefetch buffer with the matching waiting translation request by a respective match tag in the prefetch buffer. The prefetch request is then reissued into the pipeline when the associated translation request has completed. The match tags may refer to positions in the translation queue or in the address translation logic in some embodiments, such that when a translation request moves from one position to another in the translation queue, the match tags in the prefetch buffer entries are updated accordingly. In other embodiments, association between match tags and translation queue positions may be maintained dynamically as translation requests progress through the translation queue. In such an embodiment, a match tag may be assigned to a prefetch buffer entry based on the current position of the associated translation request in the translation queue, and remain constant until the prefetch request in the prefetch buffer entry is handled by the address translation logic.

FIG. 1 depicts a pipeline 100 for a processor in accordance with an embodiment. The pipleline 100 includes an instruction fetch stage 101, an instruction decode stage 102, an address generation stage 103, an operand fetch stage 104, an instruction execution stage 105, and a put away of results stage 106. Each instruction may enter the pipeline and spend one cycle at each pipeline stage. If the pipeline 100 is kept full of requests that are being processed, then each pipeline component 101-106 is kept active, and a request may be completed every pipeline cycle. The pipeline 100 may be used in conjunction with one or more caches, such as an instruction cache and an operand cache. Cache misses that occur in the instruction fetch stage 101 or operand fetch stage 104 may slow down operation of the pipeline 100.

Figure 2:
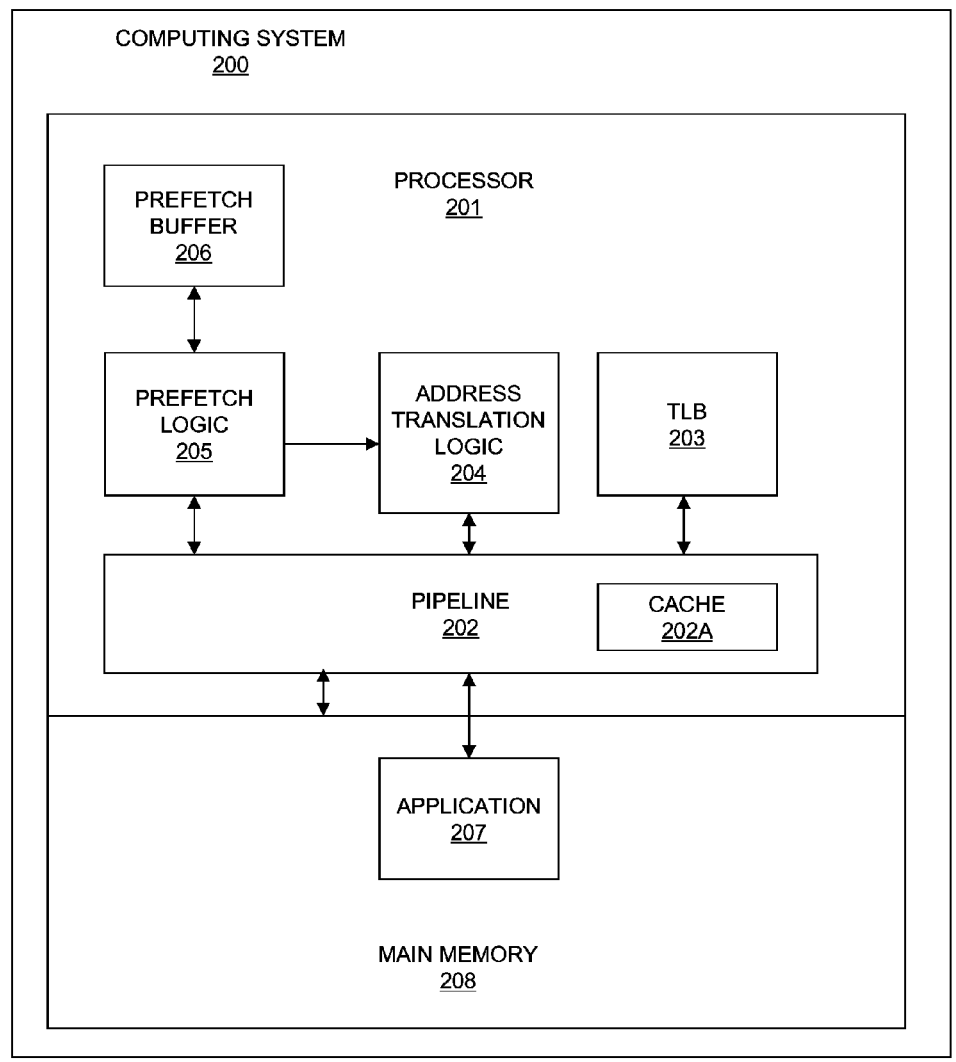
FIG. 2 depicts a computing system including prefetch address translation using a prefetch buffer in accordance with an embodiment.

FIG. 2 illustrates an embodiment of a computing system 200 including prefetch address translation using a prefetch buffer 206 in a processor 201. Computing system 200 comprises a processor 201 and a main memory 208. During execution of an application 207 by the processor 201 instructions are issued to the pipeline 202. Pipeline 202 may comprise the pipeline stages that were illustrated with respect to pipeline 100 of FIG. 1. The pipeline 202 additionally includes cache 202A, which may comprise any appropriate type of cache. The processor 201 further includes address translation resources including TLB 203 and address translation logic 204, which handle address translation requests from regular instructions and from prefetch requests that miss the cache 202A and TLB 203, providing access to the main memory 208. The prefetch logic 205 issues prefetch requests into pipeline 202. These prefetch requests act to retrieve lines from the main memory 208 to the cache 202A before the lines are needed in the pipeline 202. If a prefetch request from prefetch logic 205 misses the TLB 203 and the address translation logic 204 is busy, the prefetch request may be stored in prefetch buffer 206 until the address translation logic 204 is available to translate the prefetch request. Prefetch buffer 206 may hold any appropriate number of prefetch requests.

Figure 3:
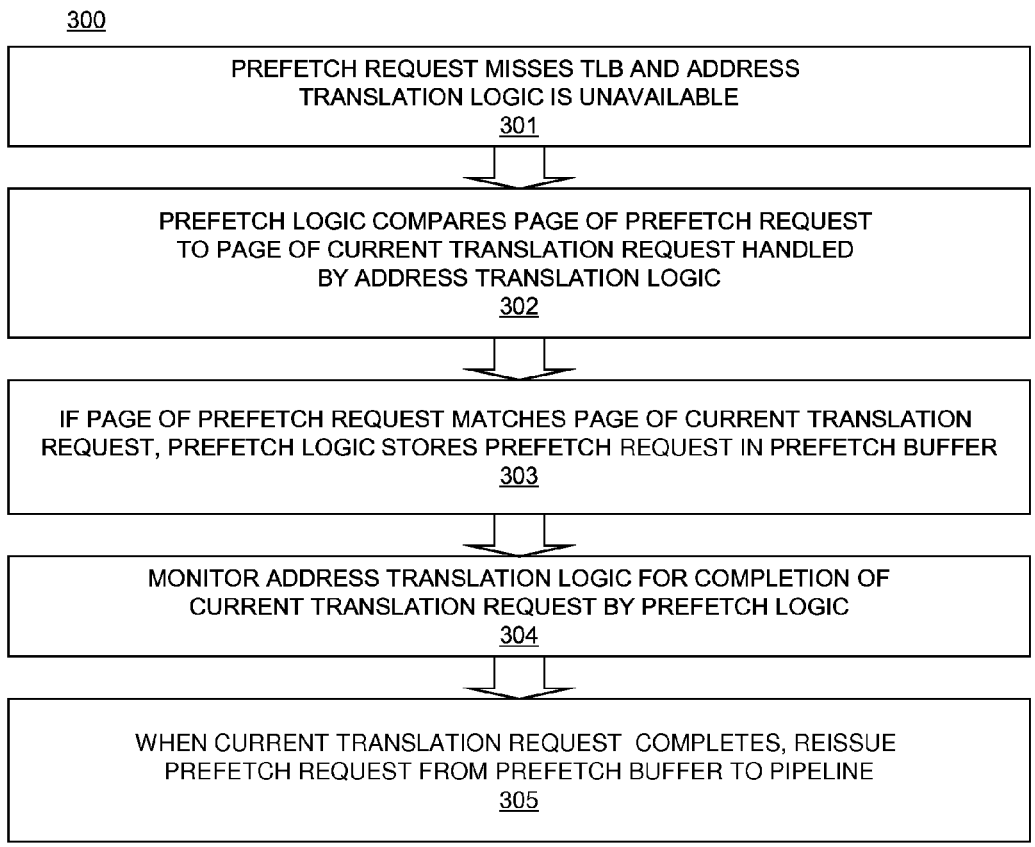
FIG. 3 depicts a process flow for prefetch address translation using a prefetch buffer in a processor in accordance with an embodiment.

FIG. 3 illustrates a flowchart of a method 300 for prefetch address translation using a prefetch buffer in accordance with an embodiment. Method 300 is discussed with respect to computing system 200 of FIG. 2. First, in block 301 of FIG. 3, a prefetch request that was issued by prefetch logic 205 misses TLB 203, and it is determined that the address translation logic 204 is not available. Flow then proceeds to block 302 of FIG. 3, in which the prefetch logic 205 compares the page, or virtual page address, of the prefetch request to a page, or virtual page address, of a translation request that is currently being handled by the address translation logic 204. Next, in block 303 of FIG. 3, if it was determined in block 302 that the page of the prefetch request matches the page of the translation request currently being handled by address translation logic 204, the prefetch request is stored in prefetch buffer 206. In some embodiments, only the displacement in the matched page of the prefetch request is stored in the prefetch buffer 206. Then, in block 304 of method 300, the prefetch logic 205 monitors the address translation logic 204 for completion of the current translation request. Lastly, in block 305 of FIG. 3, when the prefetch logic 205 determines that the current request has been completed by the address translation logic 204, the prefetch request is reissued from the prefetch buffer 206 into the pipeline 202 for translation by the address translation logic 204.

Figure 4A:
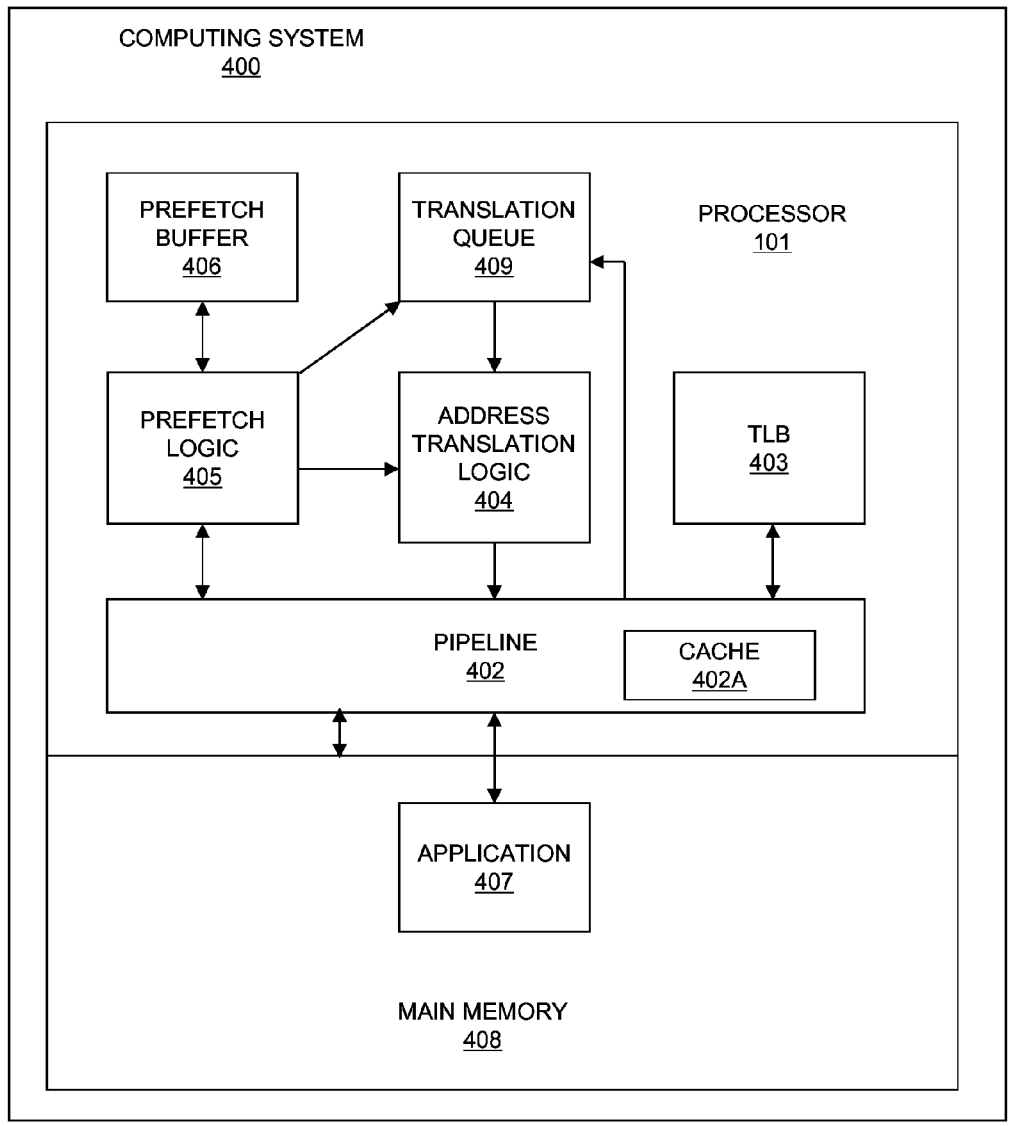

FIG. 4A illustrates an embodiment of a computing system 400 including prefetch address translation using a prefetch buffer 406 and a translation queue 409 in a processor 401. Computing system 400 comprises a processor 401 and a main memory 408. During execution of an application 407 by the processor 401, instructions are issued to the pipeline 402. The processor 401 includes a pipeline 402, which may comprise the pipeline stages that were illustrated with respect to pipeline 100 of FIG. 1. The pipeline 402 additionally includes a cache 402A, which may comprise any appropriate type of cache. The processor 401 further includes address translation resources including TLB 403 and address translation logic 404. The prefetch logic 405 issues prefetch requests into pipeline 402. These prefetch requests act to retrieve lines from the main memory 408 to the cache 402A before the lines are needed in the pipeline 402. If a prefetch request from prefetch logic 405 misses the TLB 403 and the address translation logic 404 is busy, the prefetch request may be stored in prefetch buffer 406 until the address translation logic 404 is available to translate the prefetch request. Processor 401 additionally comprises a translation queue 409, which may store non-prefetch translation requests from pipeline 402 that are waiting for the address translation logic 404 to become available. Translation queue 409 may comprise a first-in-first-out (FIFO) queue. The prefetch logic 405 may associate prefetch requests in prefetch buffer 406 with waiting translation requests in translation queue 409 based on page matches.

FIG. 4B illustrates embodiments of a prefetch buffer 406 and a translation queue 409. The prefetch buffer comprises a plurality of entries, each entry comprising a respective prefetch request entry 410A-N and match tag 411A-N. In some embodiments, only the displacement in the matched page of the prefetch request is stored in prefetch request entries 410A-N. Translation queue 409 comprises a plurality of waiting translation requests. Each match tag 411A-N indicates which translation request in the translation queue 409 has the same page as the respective prefetch request entry 410A-N associated with the match tag 411A-N. A match tag 411A-N may also indicate that its associated prefetch request entry 401A-N has a page match with the current translation request in the address translation logic 404. Prefetch logic 405 reissues prefetch request entries 410A-N to pipeline 402 from prefetch buffer 406 based on the match tags 411A-N. For example, if prefetch request entry 410A has the same page as translation request 412N, match tag 411A holds an identifier that points to translation request 412N. Prefetch logic 405 then monitors the translation queue 409 and address translation logic 404, and when translation request 412N is completed by address translation logic 404, prefetch request entry 410A is reissued to pipeline 402 for translation and completion.

The match tags 411A-N may refer to a position in the translation queue 409 in some embodiments, such that when translation requests 412A-N move from one position to another in the translation queue 409, the match tags 411A-N are updated accordingly. For example, in such an embodiment, match tag 411A may be assigned to a prefetch request entry 410A based on the current position of the associated translation request 412N in the translation queue 409 at the time of storing prefetch request entry 410A in the prefetch buffer 406. Match tag 411A is then updated as the associated translation request 412N moves through the translation queue 409 to indicate the position in translation queue of associated translation request 412N. In other embodiments, association between match tags 411A-N and positions of translation requests 412A-N in translation queue 409 may be maintained dynamically as translation requests 412A-N progress through the translation queue 409. For example, in such an embodiment, match tag 411A may be assigned to a prefetch request entry 410A based on the current position of the associated translation request 412N in the translation queue 409 at the time of storing prefetch request entry 410A in the prefetch buffer 406, and remain constant until the prefetch request entry 410A reissued to the pipeline 402. FIG. 4B is shown for illustrative purposes only; any prefetch request in the prefetch buffer may be associated with any translation request in the translation queue, and the prefetch buffer and translation queue may each comprise any appropriate number of entries.

Figure 5:
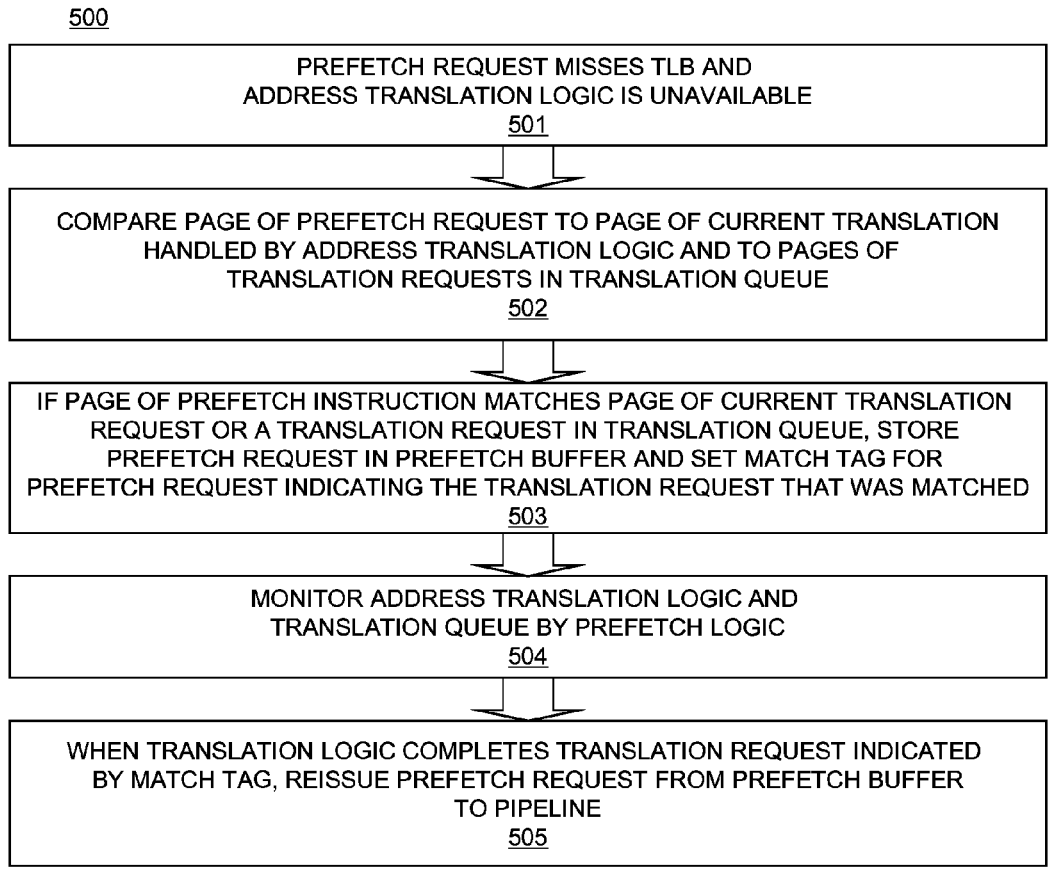
FIG. 5 depicts a process flow for prefetch address translation using a prefetch buffer and translation queue in accordance with an embodiment.

FIG. 5 illustrates a flowchart of a method 500 for prefetch address translation using a prefetch buffer and a translation queue in a processor in accordance with an embodiment. Method 500 is discussed with respect to FIGS. 4A-B. First, in block 501 of FIG. 5, a prefetch request that was issued by prefetch logic 405 misses TLB 403, and it is determined that the address translation logic 404 is not available. Flow then proceeds to block 502 of FIG. 5, in which the prefetch logic 405 compares the page, or virtual page address, of the prefetch request to a page, or virtual page address, of a translation request that is currently being handled by the address translation logic 404, and also to the pages, or virtual page addresses, of any translation requests 412A-D that are waiting in the translation queue 409. Next, in block 503 of FIG. 5, if it was determined in block 502 that the page of the prefetch request matches the page of the translation request currently being handled by address translation logic 404 or the page of a translation request 412A-D in the translation queue 409, the prefetch request entry 410A is stored in prefetch buffer 406, and match tag 411A is set to indicate the matching translation request. In some embodiments, only the displacement in the matched page of the prefetch request entry 410A is stored in the prefetch buffer 406. The match tag 411A may indicate a current position of the matching translation request in the translation queue 409. Then, in block 504 of method 500, the prefetch logic 405 monitors the address translation logic 404 and the translation queue 409. In some embodiments, the prefetch logic 405 may update the match tags 411A-N as the translation requests 412A-N move through translation queue 409. In other embodiments, the match tags 411A-D may remain constant. Lastly, in block 505 of method 500, when the prefetch logic 405 determines that the translation request indicated by a match tag of match tags 411A-N has been completed by the address translation logic 404, the associated prefetch request of prefetch requests entries 410A-N is reissued from the prefetch buffer 406 into the pipeline 402 for translation by the address translation logic 404 and completion.

In some embodiments of block 505 of method 500, after a particular translation has been completed by address translation logic 404, entries associated with the particular translation in the prefetch buffer 406 may not all be issued from the prefetch buffer 406 immediately or automatically. For example, a subsequent translation may be commenced by the address translation logic 404 before one or more entries in the prefetch buffer 406 associated with the particular translation are resissued for execution. At this point, a new prefetch request corresponding to the particular translation may be issued by prefetch logic 405. The new prefetch request may be saved in the prefetch buffer 406 with a match tag indicating that the new prefetch request is a new request. Any older prefetch requests that match the particular translation may be reissued from the prefetch buffer 405 for execution at that time; the new prefetch request may wait for another matching translation to be completed by address translation logic 406 before being reissued. Further, some embodiments that include a translation queue 409 may save a number of recently completed translations, each mapped to different match tags that are distinct from the match tags used for active or enqueued translations. These recently completed translations may be used to reissue prefetch requests from the prefetch buffer 406 for the case where a subsequent translation is available to the address translation logic 404 before all prefetch requests associated the particular translation have been reissued from the prefetch buffer 405.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
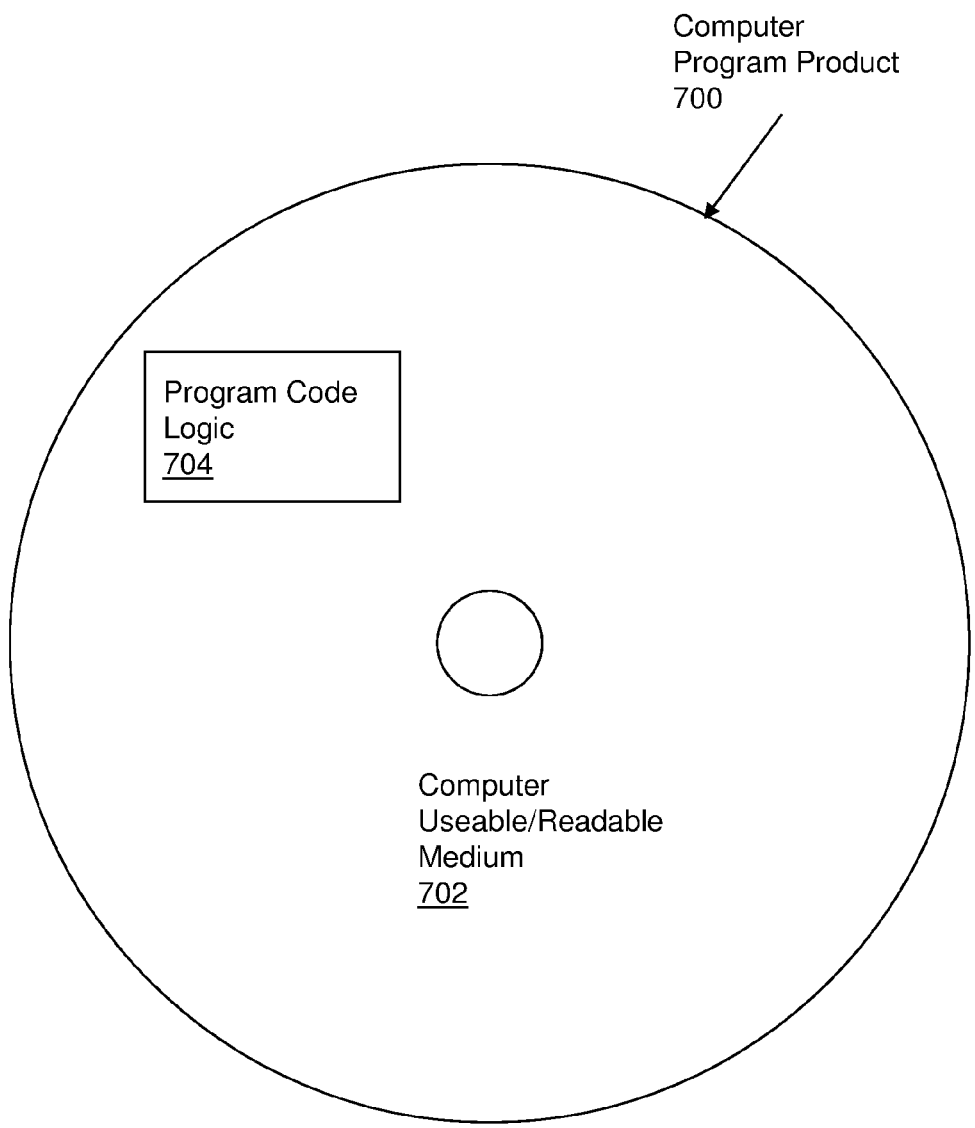
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a method, system, and computer program product for prefetch address translation in a computer processor. An aspect includes issuing, by prefetch logic, a prefetch request comprising a virtual page address. Another aspect includes, based on the prefetch request missing the TLB and the address translation logic of the processor being busy performing a current translation request, comparing a virtual page address of the prefetch request to a virtual page address of the current translation request. Yet another aspect includes, based on the virtual page address of the prefetch request matching the virtual page address of the current translation request, storing the prefetch request in a prefetch buffer.

In an embodiment, the method, system, and computer program product further include monitoring the address translation logic by the prefetch logic for completion of the translation request currently being handled by the address translation logic after storing the prefetch request in the prefetch buffer; and based on completion of the translation request currently being handled by the address translation logic, reissuing the prefetch request into the pipeline.

In an embodiment, the processor further comprises a translation queue comprising a plurality of translation requests that are waiting for the address translation logic.

In an embodiment, the method, system, and computer program product further include after comparing a virtual page address of the prefetch request to a virtual page address of the translation request currently being handled by the address translation logic, comparing the virtual page address of the prefetch request to a respective virtual page address of each of the plurality of translation requests in the translation queue; and based on the virtual page address of the prefetch request matching the virtual page address of the translation request currently being handled by the address translation logic or a respective page of one of the plurality of translation requests in the translation queue: storing the prefetch request in the prefetch buffer; and setting a match tag associated with the prefetch request in the prefetch buffer to indicate the translation request having the matching virtual page address.

In an embodiment, the method, system, and computer program product further include monitoring the translation queue by the prefetch logic, and updating the match tag based on movement of translation requests through the translation queue.

In an embodiment, the match tag remains constant until the associated prefetch request is handled by the address translation logic.

In an embodiment, the method, system, and computer program product further include monitoring the address translation logic by the prefetch logic for completion of the translation request indicated by the match tag after storing the prefetch request in the prefetch buffer; and based on completion of the translation request indicated by the match tag by the address translation logic, reissuing the prefetch request into the pipeline.

In an embodiment, storing the prefetch request in the prefetch buffer comprising storing only a displacement portion of the virtual page address of the prefetch request in the prefetch buffer, the displacement portion identifying a location within a page corresponding to the virtual page address.

Technical effects and benefits include completion of an increased number of prefetch requests in a processor, which may reduce cache miss penalties in the processor.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for prefetch address translation, the system comprising:
   a processor, the processor comprising:
      address translation logic;
      a translation lookaside buffer (TLB);
      prefetch logic; and
      a prefetch buffer, the system configured to perform a method comprising:
         issuing, by the prefetch logic, a prefetch request comprising a virtual page address;
         based on the prefetch request missing the TLB, determining whether the address translation logic is currently available to handle the prefetch request, wherein the address translation logic is not currently available to handle the prefetch request based on the address translation logic being busy performing a current translation request at the time of the issuing of the prefetch request; and
         based on determining that the address translation logic of the processor is not currently available to handle the prefetch request:
            comparing a virtual page address of the prefetch request to a virtual page address of the current translation request; and
            based on the virtual page address of the prefetch request matching the virtual page address of the current translation request, storing the prefetch request in the prefetch buffer.

2. The computer system of claim 1, further comprising monitoring the address translation logic by the prefetch logic for completion of the current translation request after storing the prefetch request in the prefetch buffer; and
   based on completion of the current translation request, reissuing the prefetch request from the prefetch buffer for translation by the TLB.

3. The computer system of claim 1, wherein the processor further comprises a translation queue comprising a plurality of translation requests that are waiting for the address translation logic.

4. The computer system of claim 3, further comprising:
   after comparing a virtual page address of the prefetch request to a virtual page address of the current translation request, comparing the virtual page address of the prefetch request to a respective virtual page address of each of the plurality of translation requests in the translation queue; and
   based on the virtual page address of the prefetch request matching the virtual page address of the current translation request or a respective virtual page address of one of the plurality of translation requests in the translation queue:
      storing the prefetch request in the prefetch buffer; and
      setting a match tag associated with the prefetch request in the prefetch buffer to indicate the translation request having the matching virtual page address.

5. The computer system of claim 4, further comprising monitoring the translation queue by the prefetch logic, and updating the match tag based on movement of translation requests through the translation queue.

6. The computer system of claim 4, wherein the match tag remains constant until the associated prefetch request is handled by the address translation logic.

7. The computer system of claim 4, further comprising monitoring the address translation logic by the prefetch logic for completion of the translation request indicated by the match tag after storing the prefetch request in the prefetch buffer; and
   based on completion of the translation request indicated by the match tag by the address translation logic, reissuing the prefetch request into a pipeline.

8. The computer system of claim 1, wherein storing the prefetch request in the prefetch buffer comprising storing only a displacement portion of the virtual page address of the prefetch request in the prefetch buffer, the displacement portion identifying a location within a page corresponding to the virtual page address.

9. A computer-implemented method for prefetch address translation using a prefetch buffer in a processor, the method comprising:
   issuing, by a prefetch logic in the processor, a prefetch request comprising a virtual page address; and
   based on the prefetch request missing a TLB, determining whether an address translation logic is currently available to handle the prefetch request, wherein the address translation logic is not currently available to handle the prefetch request based on the address translation logic being busy performing a current translation request at the time of the issuing of the prefetch request; and
   based on determining that the address translation logic of the processor is not currently available to handle the prefetch request:
      comparing a virtual page address of the prefetch request to a virtual page address of the current translation request; and based on the virtual page address of the prefetch request matching the virtual page address of the current translation request, storing the prefetch request in the prefetch buffer.

10. The computer-implemented method of claim 9, further comprising monitoring the address translation logic by the prefetch logic for completion of the current translation request after storing the prefetch request in the prefetch buffer; and based on completion of the current translation request, reissuing the prefetch request into a pipeline.

11. The computer-implemented method of claim 9, wherein the processor further comprises a translation queue comprising a plurality of translation requests that are waiting for the address translation logic.

12. The computer-implemented method of claim 11, further comprising:

after comparing a virtual page address of the prefetch request to a virtual page address of the current translation request, comparing the virtual page address of the prefetch request to a respective virtual page address of each of the plurality of translation requests in the translation queue; and based on the virtual page address of the prefetch request matching the virtual page address of the current translation request or a respective virtual page address of one of the plurality of translation requests in the translation queue:

storing the prefetch request in the prefetch buffer; and setting a match tag associated with the prefetch request in the prefetch buffer to indicate the translation request having the matching virtual page address.

13. The computer-implemented method of claim 12, further comprising monitoring the translation queue by the prefetch logic, and updating the match tag based on movement of translation requests through the translation queue.

14. The computer-implemented method of claim 12, wherein the match tag remains constant until the associated prefetch request is handled by the address translation logic.

15. The computer-implemented method of claim 12, further comprising monitoring the address translation logic by the prefetch logic for completion of the translation request indicated by the match tag after storing the prefetch request in the prefetch buffer; and based on completion of the translation request indicated by the match tag by the address translation logic, reissuing the prefetch request into the pipeline.

16. The computer-implemented method of claim 9, wherein storing the prefetch request in the prefetch buffer comprising storing only a displacement portion of the virtual page address of the prefetch request in the prefetch buffer, the displacement portion identifying a location within a page corresponding to the virtual page address.

17. A computer program product for implementing prefetch address translation, the computer program product comprising:

a tangible non-transitory storage medium readable by a processor and storing instructions for execution by the processor for performing a method comprising:

issuing, by a prefetch logic in the processor, a prefetch request comprising a virtual page address; and based on the prefetch request missing a TLB, determining whether an address translation logic is currently available to handle the prefetch request, wherein the address translation logic is not currently available to handle the prefetch request based on the address translation logic being busy performing a current translation request at the time of the issuing of the prefetch request; and based on determining that the address translation logic of the processor is not currently available to handle the prefetch request:

comparing a virtual page address of the prefetch request to a virtual page address of the current translation request; and based on the virtual page address of the prefetch request matching the virtual page address of the current translation request, storing the prefetch request in the prefetch buffer.

18. The computer program product of claim 17, further comprising monitoring the address translation logic by the prefetch logic for completion of the current translation request after storing the prefetch request in the prefetch buffer; and based on completion of the translation request currently being handled by the address translation logic, reissuing the prefetch request into a pipeline.

19. The computer program product of claim 17, wherein the processor further comprises a translation queue comprising a plurality of translation requests that are waiting for the address translation logic.

20. The computer program product of claim 19, further comprising:

after comparing a virtual page address of the prefetch request to a virtual page address of the current translation request, comparing the virtual page address of the prefetch request to a respective virtual page address of each of the plurality of translation requests in the translation queue; and based on the virtual page address of the prefetch request matching the virtual page address of the current translation request or a respective virtual page address of one of the plurality of translation requests in the translation queue:

storing the prefetch request in the prefetch buffer; and setting a match tag associated with the prefetch request in the prefetch buffer to indicate the translation request having the matching virtual page address.

* * * * *